United States Patent [19]

Craig

[11] 4,132,063
[45] Jan. 2, 1979

[54] TRACK BUSHING MACHINE AND METHOD

[75] Inventor: Fred A. Craig, San Jose, Calif.

[73] Assignee: FMC Corporation, San Jose, Calif.

[21] Appl. No.: 844,007

[22] Filed: Oct. 20, 1977

[51] Int. Cl.² ............................................. B21L 21/00
[52] U.S. Cl. ......................................... 59/7; 29/401 F
[58] Field of Search ............................. 59/7, 8, 11, 12; 29/401 F

[56] References Cited

U.S. PATENT DOCUMENTS

| | | | |
|---|---|---|---|
| 1,986,493 | 1/1935 | Abramson | 59/7 |
| 2,020,162 | 11/1935 | Rodgers | 59/7 |
| 2,387,551 | 10/1945 | Abramson | 59/7 |
| 2,392,251 | 1/1946 | Matthews | 59/7 |
| 3,028,724 | 4/1962 | Kaplan | 59/7 |
| 3,075,346 | 1/1963 | Quarve | 59/7 |

Primary Examiner—C.W. Lanham
Assistant Examiner—Gene P. Crosby
Attorney, Agent, or Firm—A. J. Moore; J. F. Verhoeven

[57] ABSTRACT

Bushings formed by rubber rings bonded to the steel tubes having octagonal bores are inserted into or removed from two parallel groups of spaced cylindrical bores formed in a track shoe that is clamped in the machine. The machine includes a single hydraulic ram having an octagonal rod secured to its piston, which rod receives predetermined arrangements of bushings and/or spacers thereon that are first pivoted into alignment with the first group of bores to insert new bushings into the bores; and are thereafter pivoted into alignment with the second group of bores to insert another group of new bushings into the second group of bores. The radius and angle of the arc through which the push rod is pivoted is arranged to position corresponding flats of the two groups of octagonal bushings at the same but complementary angles to a reference plane having the axes of the bores lying therein. By placing an elongated spacer on the push rod, old bushings may be pushed out of each group of bores. The machine also includes a swaging tool which is selectively mounted on the rod and rounds out oval or otherwise damaged bores of worn track shoes before new bushings are inserted therein.

22 Claims, 13 Drawing Figures

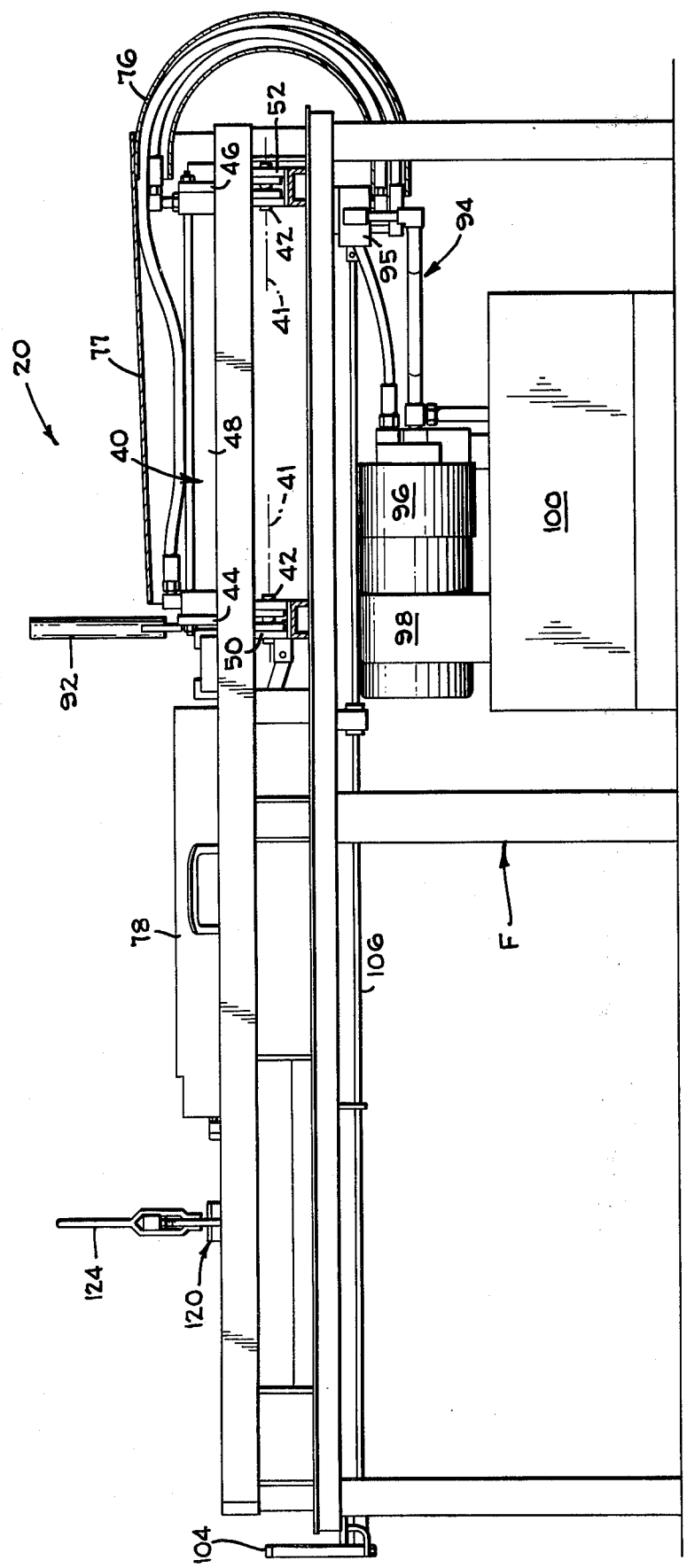
FIG_1

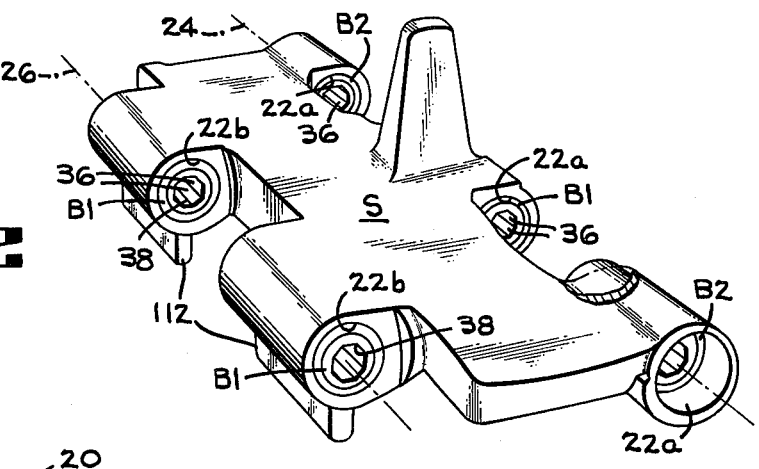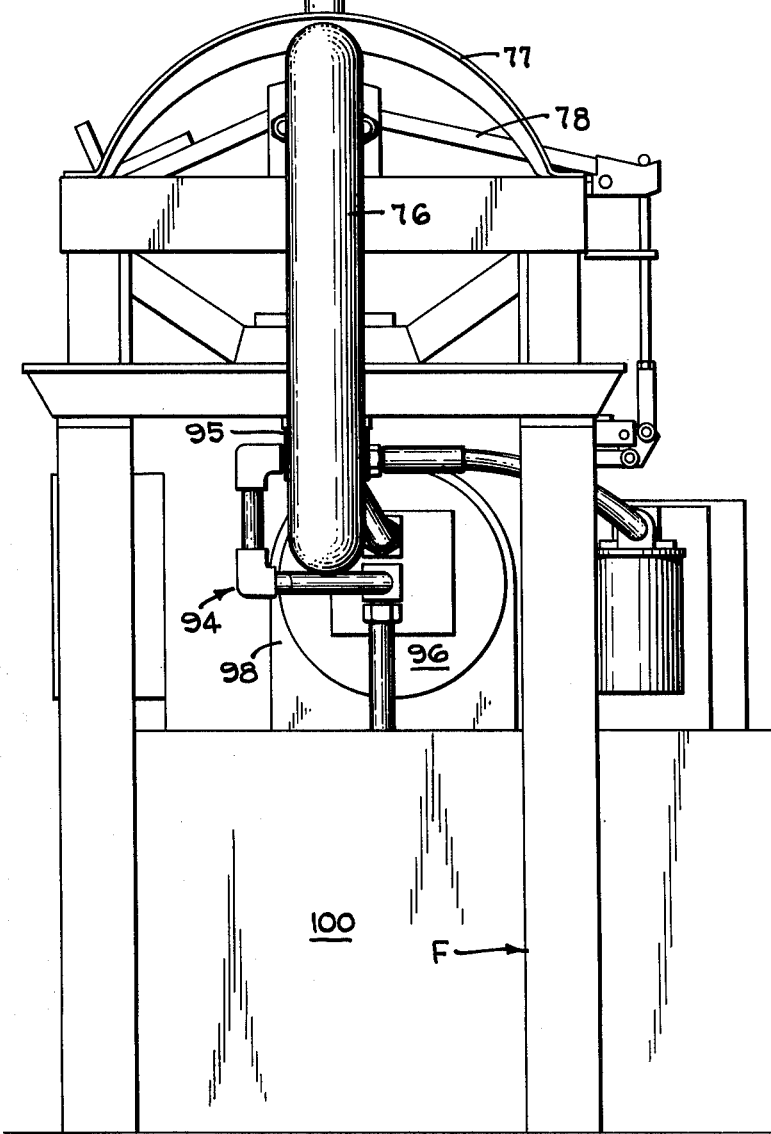

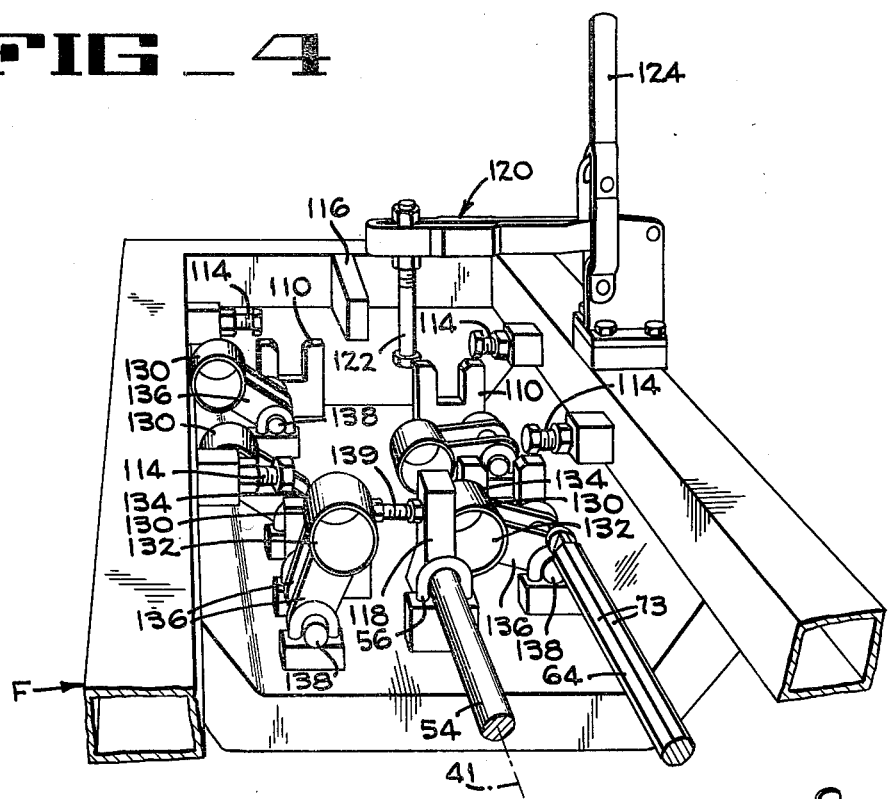
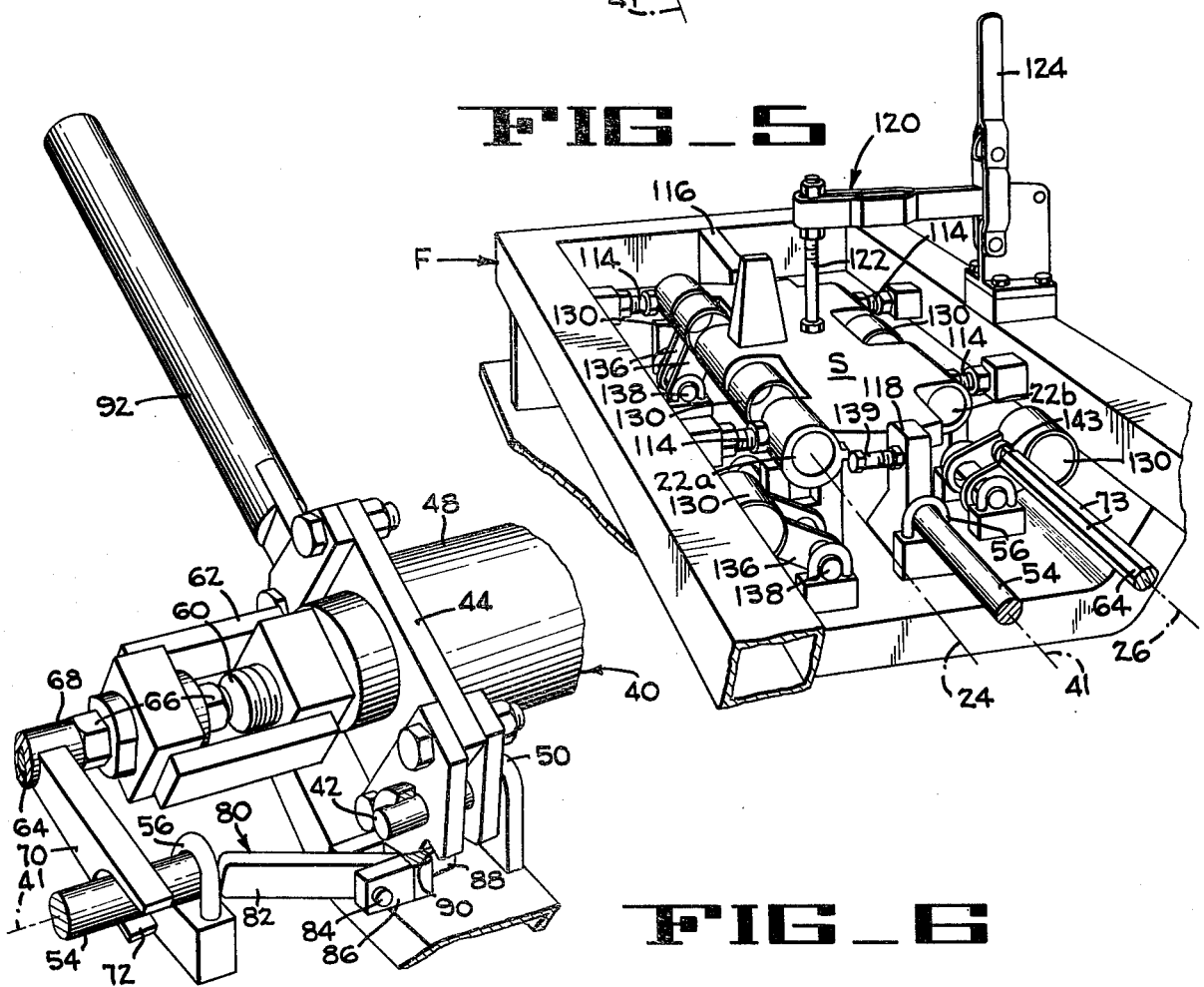

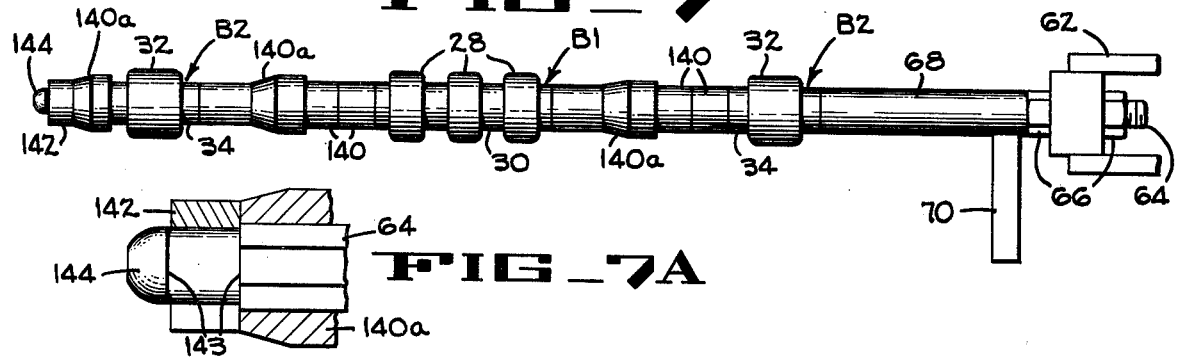
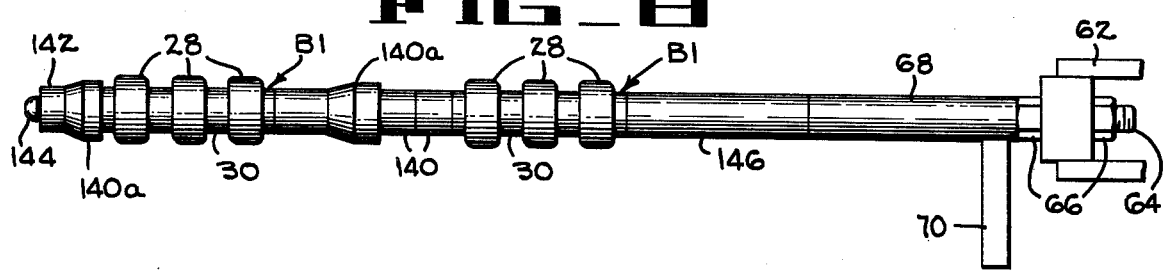
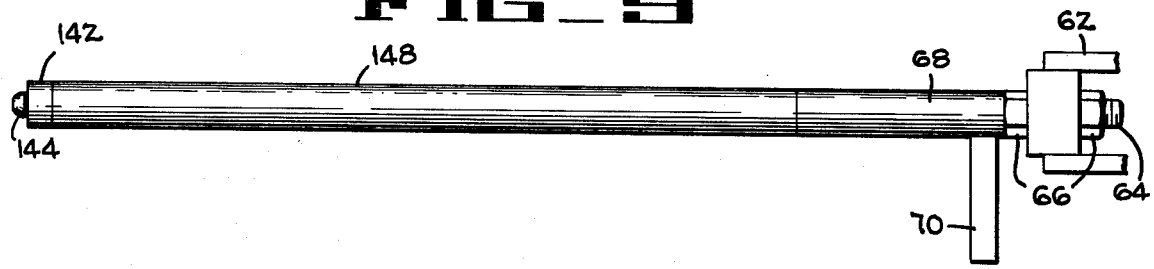
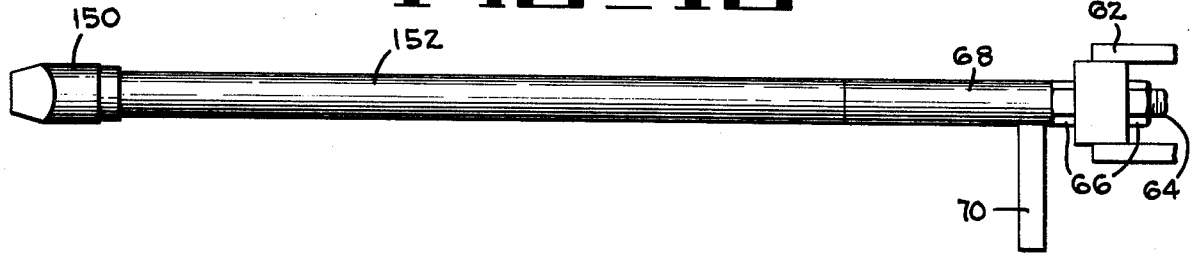

FIG_12
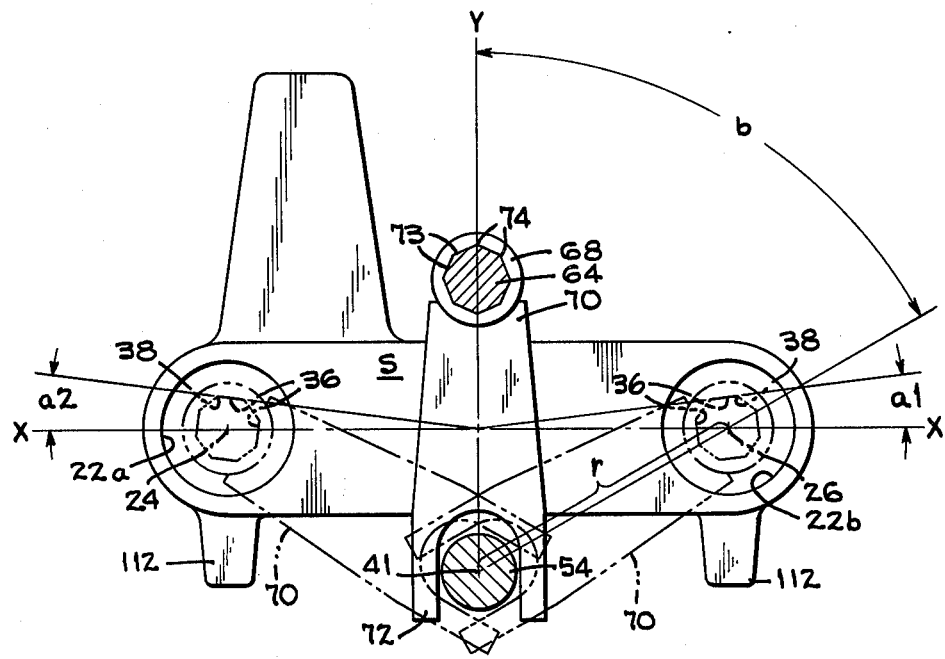
FIG_11
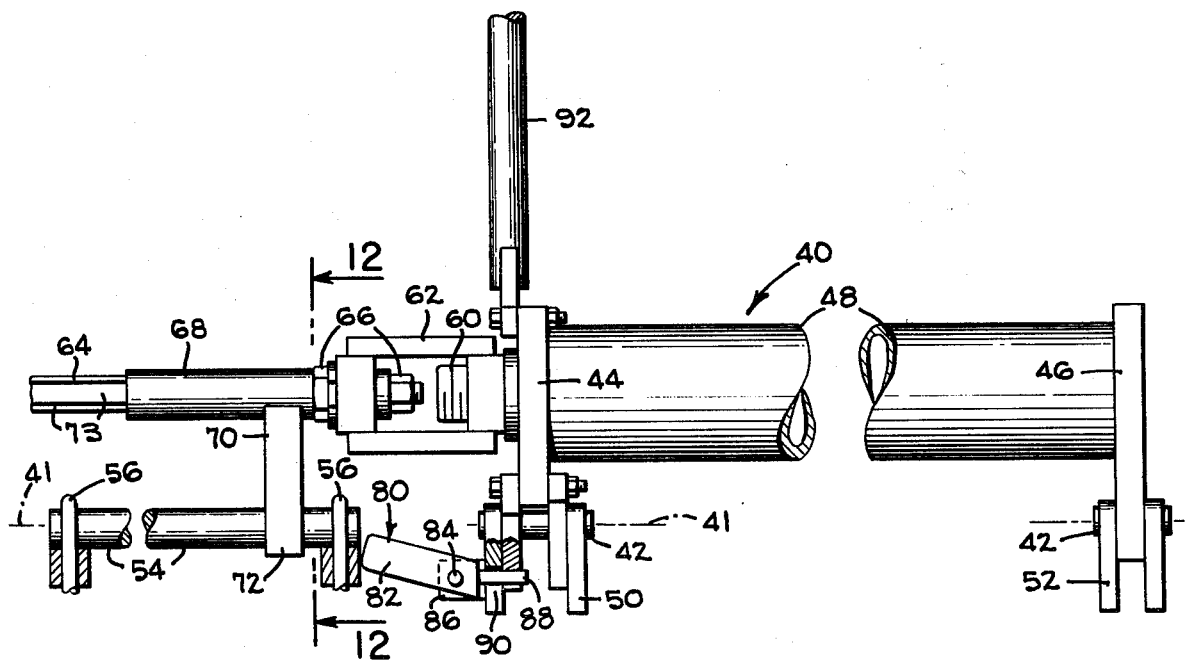

TRACK BUSHING MACHINE AND METHOD

BACKGROUND OF THE INVENTION

1. Field of the Invention

This invention pertains to a machine and method for inserting or removing bushings, preferably rubber bushings from track shoe bores of a tracked vehicle, and for reworking the bores if damaged.

2. Description of Prior Art

In the past, rubber bushings formed by rubber rings bonded to metal sleeves have been inserted into two parallel groups of cylindrical bushing receiving bores of metal track shoes by two separate push rods powered by one or more hydraulic rams. It was believed that in order to provide the correct angular relationship of the octagonal flats in each group of bushings, that a separate push rod was required for each group since the angle of the flats in one group must be complementary to the angles of the flats in the other group relative to a common plane. Because of the resilience of the rubber, the bushings were necessarily pushed a computed distance beyond their desired location in the bores by the two rams, and upon release of pressure were allowed to spring back into their desired axial positions in the bores. In the prior art devices no provision was made for adapting the push rods to pull the bushings to a precise axial position in the bores in the event the bushings were inadvertently pushed beyond their desired final position in the bores.

When track shoes require rebuilding because of worn bushings and/or partially flattened or otherwise damaged bushing bores, the prior art bushing insertion machines were not provided with means to rebuild the bores after the bushings had been removed. A separate machine was provided to perform this rebuilding function.

Although no publications have been found disclosing the above types of machines, the following patents are somewhat pertinent to the art of making or rebuilding crawler type tractor shoes and tracks made from a plurality of interconnected shoes.

U.S. Pat. No. 1,986,493 which issued to Abramson et al. on Jan. 1, 1935 discloses a two plunger portable press for removing or inserting tracks in a crawler type tractor, with one plunger associated with the bores at one end of a shoe and the other plunger associated with the bores at the other end of the shoe. The plunger not only inserts and/or removes bushings but also inserts and/or removes the pins.

U.S. Pat. No. 2,020,162 which issued to Rodgers on Nov. 5, 1935 discloses a hydraulic press used for replacing worn pins and bushings from tracks of crawler type tractors. The press includes a spring return piston having a small diameter push rod ram which pushes out the pins when the track is being held from movement by a thrust plate. An adaptor of larger diameter is used to push out the bushings. However, this patent does not disclose a ram which will both push and pull, nor does it disclose a push rod or ram that is arcuately shifted to handle both bores in a track shoe without first repositioning the shoe.

U.S. Pat. No. 2,387,551 which issued to Abramson et al. on Oct. 23, 1945 discloses a machine for disassembling and re-assembling tracks of the type wherein the side links of each shoe are separate pieces that are held together by press-fitted bushings and pins rotatable in the bushings. The links are supported by suitable clamp means, and a single push rod is used but is not pivoted between the two groups of bores in each shoe.

U.S. Pat. No. 2,392,251 which issued to Matthews on Jan. 1, 1946 discloses a tractor tread dismantler which dismantles a tread made from large rubber shoes having parallel holes therein which receive rods that have keyways near their ends. It is noted that during assembly or disassembly of the shoes that a key having tapered edges is bolted to metal links of the chain to engage flats of the keyways and maintain the flats at predetermined angles relative to each other.

SUMMARY OF THE INVENTION

The track shoe bushing machine and method of the present invention includes a hydraulic ram having a single non-circular, preferably octagonal, push rod secured thereto which is pivoted between a first position in axial alignment with a first group of axially aligned bores in a track shoe that is clamped in the machine, and a second position in axial alignment with a second group of axially aligned bores in the shoe. A first group of bushings, preferably rubber bushings, and spacers of appropriate length are locked on the push rod for insertion into the first group of axially aligned bores upon actuation of the ram. After the first group of bushings have been moved into precise axial alignment in their bores by pushing and/or pulling the rod, the bushings are released from the rod and the rod is pulled free from the bushings and spacers. Other bushings and spacers are then locked on the rod which is swung into alignment with the second group of bushings, and the insertion procedure is repeated for the second group of bushings.

A complementary angular relationship of the flats of the octagonal bores of the bushings of the first group is maintained relative to the flats of the second group if desired. This angular relationship is achieved by placing the pivot axis of the octagonal push rod and the ram and one apex of the flats of the push rod and of the octagonal bore in a common plane midway between the axes of both groups of bores. The plane is also normal to a plane containing said axes of both groups of bores. The radius and angle of pivotal movement of the rod from both sides of the midplane are preselected to provide the desired complementary angle of the flats.

When it is desired to remove worn bushings from the bores, an elongated spacer and key are secured to the rod and are alternately pushed through the first and second groups of bores to remove worn or defective bushings therefrom. In the event the track shoe bores are not truly cylindrical but are damaged, for example being deformed into a somewhat oval shape as may be the case when rebushing and rebuilding worn track shoes, a spacer and swage are slidably received on the octagonal rod and are alternately pushed through the first group of bores and thereafter are pushed through the second group of bores to return the bores to a smooth cylindrical shape.

BRIEF DESCRIPTION OF THE DRAWINGS

FIG. 1 is a side elevation of the track bushing machine of the present invention, certain parts being cut away and others being shown in section.

FIG. 2 is an end elevation of the machine of FIG. 1.

FIG. 3 is a perspective of a track shoe having four bushings properly positioned therein with a fifth bushing being improperly positioned axially of its bore.

FIG. 4 is a perspective of the track shoe clamping portion of the machine illustrating the shoe supporting and clamping components, and further illustrating bushing funnels for compressing the rubber rings before being inserted into the associated bores of the shoe, the shoe being omitted from this view.

FIG. 5 is a perspective similar to FIG. 4 but with a shoe clamped in position to receive bushings, two of the bushing funnels being pivoted out of their operative insertion positions to illustrate the shoe bores.

FIG. 6 is a perspective illustrating the joint between the single hydraulic cylinder and the octagonal rod, and further illustrating a releasable latch for holding the cylinder in a central position when mounting bushings and spacers thereon.

FIG. 7 is an enlarged elevation of the push rod with two short and one large bushing mounted thereon and separated by appropriate spacers.

FIG. 7A is an enlarged central section taken through the forward end of the push rod illustrating the key.

FIG. 8 is an elevation similar to FIG. 7 but having two large bushings and spacers thereon.

FIG. 9 is an elevation similar to FIG. 7 but illustrating the push rod having an elongated spacer thereon for pushing bushings from the bores of the track shoe.

FIG. 10 is an elevation similar to FIG. 7 but illustrating a conventional swaging tool and spacer mounted on the push rod for reworking damaged bores.

FIG. 11 is a diagrammatic elevation with parts cut away to foreshorten the view, the push rod being latched in a central upright position.

FIG. 12 is a diagrammatic section taken along lines 12—12 of FIG. 11 illustrating the push rod in three operative positions, and further illustrating the radius of curvature and the angle of swing of the rod needed to provide the preferred complementary angles of the bushing flats of the two groups of bushings.

DESCRIPTION OF THE PREFERRED EMBODIMENT

The track bushing method and machine 20 (FIGS. 1 and 2) of the present invention is capable of both inserting long bushings B1 and/or short bushings B2 (FIG. 3) into, or removing worn bushings from, the bores 22a and 22b in track shoes S, which shoes are later assembled by other means (not shown) into an endless track for a crawler type vehicle.

The track shoe S includes two groups of bushing receiving bores 22a and 22b generated about spaced parallel axes 24 and 26. Two bores 22b are generated about axis 26 and are each adapted to receive long bushings B1; while two short bores and one long bore 22a are generated about axis 24 and are adapted to receive two short bushings B2 and one long bushings B1, respectively. As indicated in FIG. 7, each long bushing B1 comprises three relatively narrow rubber rings 28 bonded to the outer surface of a long steel sleeve 30, while each short bushing B2 includes a single wide rubber ring 32 bonded to the outer surface of a short steel sleeve 34. The internal surfaces of the sleeves 30 and 34 are of non-circular, herein illustrated and referred to as octagonal, configurations defined by a plurality of flats 36 (FIGS. 3 and 12) with each flat connected to the adjacent flat at an apex 38. The bushings B1 and B2 will be referred to hereinafter as rubber bushings having octagonal bores. It will be understood, however, that the rings 28 and 32 may be made of other resilient material having characteristics similar to rubber, and that the bushing bores need not be octagonal but may be of other non-circular configurations having at least a pair of flats of equal size. Although the drawings illustrate "flats" in the non-circular bushing bores, it will be understood that the term "flats" are used in the specification and claims is to be construed broad enough to include other configurations, such as oval or triangular, which will maintain the non-circular bushing bores in the associated groups of track shoe bores at predetermined complementary angles as will be described hereinafter.

The track bushing machine 20 (FIG. 1 and 2) comprises a rigid frame F which supports a hydraulic ram 40 mounted for pivotal movement about a pivot axis 41 by means of pivot pins 42 received in brackets 44 and 46 secured to the cylinder 48 of the ram 40, and by yokes 50 and 52 rigid with the frame F. The pins 42 are concentric with a slide bar 54 (FIGS. 4–6) that is clamped to the frame F by U-bolts 56.

The ram 40 includes a piston rod 60 (FIGS. 6 and 11) which is threaded to receive a box coupling 62 that has an octagonal push rod 64 rigidly secured thereto and held in place by locknuts 66. A rod supporting sleeve 68 having an octagonal inner surface is slidably received on the rod 64. A leg 70 is welded to the sleeve 68 and has a forked lower end 72 which slidably engages the slide bar 54 to assist in supporting the octagonal rod in axial alignment with the piston rod 60 and also maintains flats 73 (FIGS. 11 and 12) of the octagonal rod 64 in desired angular relationship as will be described in more detail hereinafter.

As best shown in FIGS. 1 and 2, a large diameter flexible hose guard 76 encompasses the curved portion of the hydraulic hoses connected to the ram 40; and the ram 40 is enclosed within an arcuate cover 77 secured to the frame F. A push rod cover 78, shown only on a horizontal position in FIGS. 1 and 2, is pivoted to the frame F for movement between the horizontal closed position and an upright open position.

As best shown in FIGS. 6 and 11, a manually operated latch 80 includes an arm 82 that is pivoted to the frame F by a pin 84 received in a yoke 86 secured to the frame F. The latch arm 82 is weighted so that gravity normally holds a latch finger 88 of the arm in a slot 90 formed in the bracket 44 when the operator moves the ram 40 to a vertical upright position by means of a handle 92 secured to the bracket 44 as indicated in FIGS. 1, 2 and 11. When the handle 92 is latched in the upright position, the octagonal rod 64 will be held in position permitting bushings B1 and B2 to be slid thereon without interference with other portions of the machine 20. The latch 80 is easily released by lifting up on the latch arm 82.

A hydraulic system 94 (FIGS. 1 and 2) includes a four-way control valve 95 and is provided to circulate hydraulic fluid to the ram 40. The hydraulic system 94 is of conventional design and includes a hydraulic pump 96 that is powered by motor 98 which draws hydraulic fluid from a sump 100. The pump circulates high pressure fluid through conduits to either end of the cylinder 48 as determined by the position of the bore in the valve 95. The valve bore is shifted between its two positions by an operator's handle 104 that is connected to the core by an elongated rod 106 journaled on the frame F.

As best illustrated in FIGS. 3 and 5, the shoe S to be bushed or to have worn bushings removed therefrom is rigidly secured in a predetermined position in the frame F. The frame F has four spaced adjustable U-shaped brackets 110 bolted thereto which receive flanges 112 (FIGS. 2 and 12) of the shoe S. Four capscrews 114 are threaded in the sides of the frame F and are locked in desired position to slidably receive, but prevent any significant lateral movement of, the shoe S relative to the frame F when lowered downwardly into operative position or lifted from the operative position. Similarly, end abutment means 116 and 118 slidably receive the shoe but prevents any significant movement longitudinally of the frame F. In order to hold the shoe S in operative position, any well known clamp means 120 is provided for bearing down upon the upper surface of the shoe S. The illustrated clamping means 120 is pivotally mounted on the frame F and may be pivoted between the illustrated shoe clamping position wherein a bolt 122 engages the upper surface of the shoe, and a position wherein the bolt is pivoted upwardly away from the shoe by manual actuation of the handle 124. It will be understood that the shoes S are lowered into and lifted from the machine when the clamp 120 is in its inoperative position.

The rubber rings 28 of the long bushings B1, and the rings 32 of the short bushings B2, are of larger diameter when unstressed than the bores 22a and 22b in which they are to be inserted. Accordingly, these rubber rings must be compressed before they are inserted into the bushing receiving bores 22a or 22b in the track shoes S. For this purpose a funnel 130 (FIGS. 4 and 5) is pivoted into axial alignment with and at a point immediately adjacent the inlet end of each bore 22a,22b when the machine is to be used for inserting bushings B1 and/or B2 into the bores. Each funnel 130 has an inlet end 132 which is larger in internal diameter than the diameter of the unstressed rubber rings 28,32 and has an outlet end 134 that has an internal diameter that is equal to or slightly smaller than the diameter of the bores 22a and 22b. Each funnel 130 is secured to legs 136 mounted on a pin 138 pivotally received in the frame F for pivotal movement through an arc. The diameter of the outside cylindrical surface of each funnel 130 and the radius of the arc are of predetermined size so that the longitudinal axis of each funnel will be concentric with the associated axes 24,26 of the associated bores 22a,22b when four of the five funnels 130 are resting in abutting engagement against the shoe S. As illustrated in FIG. 5, two of the funnels have not been pivoted into their bushing insertion position. Since one of the funnels 130 cannot rest against the shoe S, a stop bolt 139 is screwed into the abutment 118 into position to hold that shoe in alignment with the axis 26 as shown in FIG. 4.

When the track bushing machine 20 is to be used for removing worn bushings from the bores 22a,22b or when reworking the bushing bores, the funnels 130 are pivoted out of alignment with the associated axes 24,26 of the bores and rest against the frame F.

As mentioned previously, the track bushing machine may be used to push bushings B1 and/or B2 into groups of bores 22a,22b disposed near the opposite ends of the shoe; may be used to remove worn bushings from the bores; and may be used to return oval or otherwise damaged bores to their original smooth surfaced condition. In order to perform these three functions, separate components are assembled on the push rod 64, and these components will be referred to herein and in the claims as track shoe assembly-rebuilding means.

FIG. 7 illustrates the push rod 64 having two short bushings B2 and one long bushing B1 mounted thereon. Spacers of different axial length, generally designated 140, including frusto-conical guides 140a, of suitable lengths are positioned on the rod forwardly of each bushing to axially space the bushings the same distance from each other as the distance between the bores 22a.

A generally U-shaped key 142 (FIGS. 7 and 7A) is slidably received in parallel slots 143 (only one being shown in FIGS. 5 and 7A) formed in the forward end of the octagonal push rod 64, which forward end is rounded to the diameter of the flats of the rod 64 and also has a somewhat spherical end 144. The rounding of the end of the push rod permits the bushings to be easily placed on the rod and then turned until the flats of the octagonal bushing bore are aligned with the flats of the octagonal push rod 64. After the bushings and spacers are placed on the rod 64, the key 142 is dropped into the slots 143 as indicated in FIG. 7A.

As indicated previously, the push rod may be latched in its upright position when inserting the bushings B1 and/or B2, the spacers 140, the frusto-conical guides 140a and the key 142 on the push rod 64. An alternate procedure for loading these items on the push rod is to place the push rod in the position illustrated in FIG. 5, i.e., in alignment with the axis 26 of the two bore end of the track shoe S. The distance between the end of the push rod 64 and the track shoe bores 22b is sufficient to permit loading the bushings B1 and/or B2 and spacers on the rod at this location. The latch 80 may be removed from the machine if this alternate loading procedure is to be followed.

After the push rod has been loaded, and the push rods and funnels 130 (FIG. 5) have been moved into alignment with the bushing axis 24, the hydraulic ram is actuated to push the bushings B1 and B2 into their appropriate bores 22a. The bushings are pushed beyond their desired axial positions in the bores, since the rubber tends to deflect rearwardly, and are thereafter pulled rearwardly by the push rod 64 and key 142 until in desired axial position in their respective bores. The key 142 is removed from the rod and the rod is then pulled free of the bushing bores. If one of the three bushings is not in desired axial position, the push rod 64 may be pushed through the misaligned bushing, the key may be placed on the rod and the ram may be actuated to push or pull the single misplaced bushing into desired axial position.

FIG. 8 illustrates two long bushings B1, spacers 140, guides 140a and an additional spacer 146 clamped together on the push rod 64 by the key 142. After pivoting the push rod 64 and associated funnels 130 into alignment with the bores 22b (FIG. 5), the ram 40 is activated to push and then pull this group of bushings into proper axial alignment in the bores 22b as described above.

If worn bushings are to be pushed out of the bores 22a,22b of a used track shoe, an elongated sleeve 148 (FIG. 9) is retained on the rod 64 by the key 142. The push rod is then aligned with one group of bores and the funnels 130 are pivoted out of alignment with said bores before the ram 40 is actuated to push the worn bushings out of their bores. The push rod is then pulled out of the bores and is pivoted into alignment with the other group of bores before the ram is again actuated as above described. If the bores in the worn shoes are oval, rather than cylindrical, or if the bores are otherwise damaged, a swaging tool 150 (FIG. 10) and an elongated sleeve 152 are slidably mounted on the push rod 64 and are pivoted into position to be pushed through one group of unbushed bores and then through the other group of unbushed track shoe bores. It will be understood that the swaging tool 150 has a cylindrical recess therein which slidably receives the free end of the push rod 64.

As mentioned previously, it is necessary to insert the bushings B1,B2 in their appropriate bores at predetermined bushing insertion angles, a1 and a2, so that one of the flats 36 (FIG. 12) of each bushing in one group of bushings is angled downwardly and toward the center of the shoe S, when the shoe is positioned as illustrated in FIG. 12; while one flat 36 of each bushing in the other group is likewise angled downwardly and toward the center of the shoe at the same angle. Thus, the angles a1 and a2 of the flats 36 relative to a plane containing the axes 24,26 of the two groups of bores are complementary angles which angles are referred to herein as bushing insertion angles. In order to assure that the bushing insertion angles a1 and a2 are equal and complementary relative to the plane X; the push rod 64 is first latched in the solid line upright position as illustrated in FIG. 12. The nuts 66 (FIG. 6), which clamp the push rod 64 to the coupling 62, are then tightened after one of the apexes 74 of the octagonal push rod has been positioned in the vertical central plane Y (FIG. 12) of the shoe S, which vertical plane is normal to the plane X and has the axis 41 of the guide rod 54 and the axis of the push rod 64 lying therein. Thus, the radius r of the pivotal movement of the push rod 54 and the angle b through which the push rod travels while moving between the vertical plane Y and one of the bore axes 24 or 26 determines the bushing insertion angles a1, a2.

In the preferred embodiment of the invention the distance between the axes 24 and 26 of the two groups of bores is 6.60 inches; the bushing insertion angles a1 and a2 are both 7°; the angle b is 60.5° and the radius r is 3.75 inches. It is apparent that the radius r and the angle b through which the push rod 64 travels may be changed if it is desired to provide bushing insertion angles a1 and a2 that are larger or smaller than the preferred 7°. it has also been determined that in the illustrated preferred embodiment, the bushings must be pushed in excess of 0.6 inches beyond their desired axial position in their bores, since the resilience of the rubber tends to trail, and then the bushing must be pulled back to the desired position.

From the foregoing description it is apparent that the track bushing machine of the present invention includes a single ram and push rod which is pivoted between a position in alignment with one group of bores in a track shoe clamped in the machine, and a second group of bores near the other end of a track shoe without reorienting the track shoe. Preselected groups of rubber bushings having non-circular bores and spacers are keyed in desired axial spacing and are pushed into the associated group of bores, and if necessary, are pulled out of the bores until proper axial alignment in the bores is achieved. After release of the key, the push rod is pulled free of the first group of bushings which remain in their track shoe bores. A second group of bushings and spacers are then keyed to the push rod and are similarly fitted into the second group of bores. The pivot radius of the push rod and the pivot angle are predetermined so that the bushing insertion angle of one of the flats of each bushing bore in one group of bushings is complementary to the angle of flats in the other group of bores.

The push rod may be used to push worn bushings out of both groups of track shoe bores, and may also be provided with a swaging tool to return oval or otherwise damaged track shoe bores in both groups of bores to a damaged track shoe bores in both groups of bores to a cylindrical configuration.

Although the best mode contemplated for carrying out the present invention has been herein shown and described, it will be apparent that modification and variation may be made without departing from what is regarded to be the subject matter of the invention.

What I claim is:

1. A track shoe assembly and rebuilding machine for track shoes having means defining two groups of axially spaced track shoe bores generated about parallel axes: comprising means for clamping a shoe in fixed position, a push rod, means for supporting said push rod for pivotal movement between a position in alignment with the axis of the first group of track shoe bores and the axis of the second group of track shoe bores, power means operatively connected to said push rod for first pushing the rod into and thereafter pulling the rod from one of said groups of track shoe bores, and for subsequently pushing the push rod into and thereafter pulling the rod from the other group of track shoe bores, and track shoe assembly-rebuilding means carried by said push rod for entry into said groups of track shoe bores when said push rod is pushed into said track shoe bores.

2. An apparatus according to claim 1 wherein said track shoe assembly-rebuilding means comprises a swaging tool and sleeve carried by said push rod, said swaging tool being pushed through one group of track shoe bores and thereafter through the other group of track shoe bores after the bushings have been removed therefrom for returning the inner surfaces of said bores to a smooth cylindrical configuration.

3. An apparatus according to claim 1 wherein said power means is a fluid operated ram that is rigidly connected to said push rod and said push rod supporting means for pivotal movement with said push rod.

4. An apparatus according to claim 1 wherein said track shoe assembly-rebuilding means are a plurality of bushings, and additionally comprising means for securing said bushings on said push rod at the same spacing as the axial spacing of one of said groups of track shoe bores, and means for controlling said power means to axially center each of the bushings in an associated bore of said one group of the bores, said securing means and said bushings being released from said push rod before said push rod is withdrawn from said bushings and said one group of track shoe bores.

5. An apparatus according to claim 4 wherein said track shoe assembly-rebuilding means includes a second plurality of bushings, means for securing said second plurality of bushings on said push rod at the same spacing as the axial spacing of the other of said group of track shoe bores, said means for controlling said power means adapted to center each of the second bushings in an associated bore of the other group of track shoe bores, said securing means and said second bushings being released from said push rod before said push rod is withdrawn from said second bushings and the second group of track shoe bores.

6. An apparatus according to claim 4 wherein said power means is effective to both push and pull said bushings until centered in their associated bores.

7. An apparatus according to claim 5 wherein said power means is effective to both push and pull said bushings until centered in their associated bores.

8. An apparatus according to claim 5 wherein each of said bushings includes at least one rubber ring secured to a tubular metal sleeve with the unstressed diameter of said rubber ring being greater than the internal diameter of said track shoe bore, and funnel means movable into axial alignment with and upstream of each of said track shoe bores prior to movement of said push rod into said bores, each funnel means including an inside surface having an inlet diameter greater than the unstressed diameter of said rubber ring and an outlet diameter smaller than the diameter of said adjacent track shoe bore.

9. An apparatus according to claim 1 wherein said track shoe assembly-rebuilding means is a sleeve and key means for securing said sleeve on said push rod, the exterior cross-sectional dimension of said sleeve and key being larger than the bore within said bushings whereby movement of said push rod through the two groups of track shoe bores will remove the bushings from said bores.

10. An apparatus according to claim 9 wherein each of said bushings includes at least one rubber ring secured to a tubular metal sleeve with the unstressed diameter of the rubber being greater than the internal diameter of the track shoe bore.

11. A track shoe assembly and rebuilding machine for track shoes having means defining two groups of axially spaced bores generated about parallel axes, each bore of said track shoe when assembled having a bushing therein with a non-circular bore defining at least a pair of flat surfaces in the bushings, comprising: means for clamping a shoe in fixed position, a push rod having a non-circular outer peripheral surface complementary to said non-circular bushing bore, means for supporting said push rod for pivotal movement between a position in alignment with the axis of the first group of track shoe bores and the axis of the second group of track shoe bores, power means operatively connected to said push rod for first pushing the rod into and thereafter pulling the rod from one of said groups of track shoe bores, and for subsequently pushing the push rods into and thereafter pulling the rod from the other group of track shoe bores, and track shoe assembly-rebuilding means carried by said push rod for entry into said groups of track shoe bores when said push rod is pushed into said track shoe bores.

12. An apparatus according to claim 11 wherein each of said bushings includes at least one rubber ring secured to a tubular metal sleeve.

13. An apparatus according to claim 11 wherein said track shoe assembly-rebuilding means are a first and second plurality of said bushings selectively assembled on said push rod, means for securing said first bushings on said push rod at the same axial spacing as the axial spacing of one of said group of track shoe bores, each bushing of said first plurality of bushings when aligned with said one group of track shoe bores having one of said flats disposed at a predetermined angle relative to a reference plane containing the axes of both of said track shoe bores, each bushing of said second group of bushings when aligned with said other group of track shoe bores having one of said flats disposed at an angle to said reference plane that is complementary to said predetermined angle.

14. An apparatus according to claim 13 wherein said power means is effective to both push and pull said bushings until centered in their associated bores.

15. An apparatus according to claim 13 and additionally comprising means for controlling said power means to axially center each of the first bushings in an associated bore of said one group of bores, said securing means and said bushings being released from said push rod before said push rod is withdrawn from said bushings and said one group of track shoe bores, said means for controlling said power means selectively operated to center each of the second bushings in an associated bore of said other group of track shoe bores, said securing means and said second bushings being released from said push rod before said push rod is withdrawn from said second group of track shoe bores, the angle of said flats of said first and second groups of bushings remaining at said predetermined and complementary angles after being assembled in the associated track shoe bushing.

16. An apparatus according to claim 15 wherein each of said bushings includes at least one rubber ring secured to a tubular metal sleeve with the unstressed diameter of said rubber ring being greater than the internal diameter of said track shoe bore, and funnel means movable into axial alignment with and upstream of each of said track shoe bores prior to movement of said push rod into said bores, each funnel means including an inside surface having an inlet diameter greater than the unstressed diameter of said rubber ring and an outlet diameter smaller than the diameter of said adjacent track shoe bore.

17. A method of assembling and rebuilding track shoes with first and second groups of bushings selectively mounted on a single push rod for insertion into first and second groups of track shoe bores; comprising the steps of clamping a track shoe in fixed position, loading and clamping a first group of bushings on said rod at axially spaced intervals equal to the axial spacing of the first group of track shoe bores, pivoting the first group of bushings into alignment with the first group of track shoe bores, pushing said first group of bushings into said first group of track shoe bores until axially centered in associated bores, releasing the first group of bushings from said push rod, withdrawing the rod from the first group of bores, loading and clamping a second group of bushings on said rod at axially spaced intervals equal to the axial spacing of the second group of track shoe bores, pivoting the second group of bushings into alignment with the second group of track shoe bores, pushing said second group of bushings into said second group of track shoe bores until axially centered in associated bores, releasing the second group of bushings from said rod, and withdrawing the rod from the second group of track shoe bores.

18. A method according to claim 17 wherein each bushing is a rubber bushing including at least one rubber ring bonded to a metal sleeve with the outside diameter of the rubber ring being greater than the diameter of the associated track shoe bores in which the bushings are to be inserted, and additionally comprising the step of compressing each rubber ring to a diameter equal to or less than the diameter of the track shoe bore prior to inserting the bushing into the bore.

19. A method according to claim 17 and additionally comprising the step of pulling said bushings in their associated track shoe bores in the event the bushings were pushed beyond their desired centered position in their associated bores.

20. A method according to claim 17 wherein each bushing includes a non-circular bore defining at least a pair of flats and wherein the outer periphery of the push rod includes at least a pair of flats and corresponds to the bushing bore to slidably receive said bushings, and additionally comprising the step of orienting the flats on the push rod and bushings so that the push rod when in alignment with said one group of track shoe bores has one of its flats disposed at a predetermined angle relative to a reference plane containing the axes of both of said shoe bores, and when the push rod is pivoted into alignment with the other track shoe bores one of said flats on said push rod and on each bushing being at an angle that is complementary to said predetermined angle relative to said reference plane.

21. A method according to claim 17 wherein said track shoe is a used track shoe having bushings therein to be replaced, and additionally including the initial steps of mounting and clamping a sleeve on said push rod, and forcing said push rod through said first group of track shoe bores to remove worn bushings therefrom and thereafter moving said bushings through said second track shoe bores to remove worn bushings therefrom.

22. A method according to claim 21 and additionally including the steps of mounting a sleeve and swage on the push rod, forcing the swage through the first group of track shoe bores, and thereafter forcing the swage through the second group of track shoe bores to return damaged bores to a cylindrical configuration before inserting new bushings into said track shoe bores.

* * * * *

UNITED STATES PATENT OFFICE
CERTIFICATE OF CORRECTION

Patent No. 4,132,063                    Dated January 2, 1979

Inventor(s) FRED A. CRAIG

It is certified that error appears in the above-identified patent and that said Letters Patent are hereby corrected as shown below:

Col. 8, line 3, delete the entire line.

Signed and Sealed this

Eighteenth Day of March 1980

[SEAL]

Attest:

SIDNEY A. DIAMOND

Attesting Officer    Commissioner of Patents and Trademarks